(12) United States Patent
Fleureau et al.

(10) Patent No.: US 11,122,101 B2
(45) Date of Patent: Sep. 14, 2021

(54) METHOD AND APPARATUS TO ENCODE AND DECODE TWO-DIMENSION POINT CLOUDS

(71) Applicant: THOMSON Licensing, Issy-les-Moulineaux (FR)

(72) Inventors: Julien Fleureau, Rennes (FR); Bertrand Chupeau, Rennes (FR); Renaud Dore, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 61 days.

(21) Appl. No.: 15/969,009

(22) Filed: May 2, 2018

(65) Prior Publication Data
US 2018/0324240 A1  Nov. 8, 2018

(30) Foreign Application Priority Data

May 4, 2017  (EP) .................................. 17305504

(51) Int. Cl.
*H04N 19/90* (2014.01)
*H04L 29/06* (2006.01)
(Continued)

(52) U.S. Cl.
CPC .......... *H04L 65/607* (2013.01); *G06T 3/0031* (2013.01); *G06T 9/001* (2013.01);
(Continued)

(58) Field of Classification Search
CPC . G06T 2207/10028; G06T 19/20; G06T 7/50; G06T 9/00; G06T 9/001;
(Continued)

(56) References Cited

U.S. PATENT DOCUMENTS 6,912,323 B2 * 6/2005 Copeland .............. G06F 17/153
                                              242/163
7,236,613 B2 * 6/2007 Murata ................... G01S 17/46
                                              382/103
(Continued)

FOREIGN PATENT DOCUMENTS

EP        2300982        7/2015
EP        2947630        11/2015

OTHER PUBLICATIONS

Castillo et al., "A Practical Guide to Direct Optimization for Planar Grid-Generation", Computers and Mathematics with Applications, vol. 37, No. 9, May 1999, pp. 123-156.

(Continued)

*Primary Examiner* — Jessica M Prince
(74) *Attorney, Agent, or Firm* — Invention Mine LLC

(57) ABSTRACT

The present disclosure relates to methods, devices or streams for encoding, transmitting and decoding two-dimension point clouds. When encoding point clouds as frames, a large number of pixels are not used. A dense mapping operator optimizes the use of pixels but requires a lot of data to be encoded in the stream and its inverse operator is difficult to compute. A simplified mapping operator is generated according to a dense mapping operator and is stored as matrices of two-dimension coordinates representative of an unfolded grid which requires low space in the stream. The inverse operator is easy to generate according to the unfolded grid.

11 Claims, 5 Drawing Sheets

(51) Int. Cl.
*H04N 19/85* (2014.01)
*G06T 9/00* (2006.01)
*G06T 3/00* (2006.01)
*H04N 19/70* (2014.01)

(52) U.S. Cl.
CPC .............. *H04N 19/70* (2014.11); *H04N 19/85* (2014.11); *H04N 19/90* (2014.11)

(58) Field of Classification Search
CPC ........... G06T 17/00; G06T 7/521; G06T 7/73; G06T 19/00; G06T 2207/10016; G06T 17/05; G06T 2207/30252; G06T 2207/20081; G06T 17/20; G06T 2207/20084; G06T 7/20; G06T 15/08; G06T 2207/10024; G06T 3/4007; G06T 3/0031; G06T 3/0093; H04L 65/607; H04N 19/70; H04N 19/85; H04N 19/90
See application file for complete search history.

(56) References Cited

U.S. PATENT DOCUMENTS

| | | | | |
|---|---|---|---|---|
| 9,351,106 B2* | 5/2016 | Markham | ............ | H04B 1/0064 |
| 10,043,305 B2* | 8/2018 | Lo | ............ | G06T 19/006 |
| 10,565,779 B2* | 2/2020 | Lo | ............ | G06T 3/0093 |
| 2001/0051860 A1* | 12/2001 | Copeland | ............ | G06F 17/153 |
| | | | | 703/2 |
| 2005/0045825 A1* | 3/2005 | Murata | ............ | G01S 17/46 |
| | | | | 250/342 |
| 2005/0223337 A1* | 10/2005 | Wheeler | ............ | G06F 3/04845 |
| | | | | 715/806 |
| 2013/0057644 A1 | 3/2013 | Stefanoski et al. | | |
| 2013/0116977 A1* | 5/2013 | Godbaz | ............ | G01S 17/89 |
| | | | | 702/189 |
| 2014/0155098 A1* | 6/2014 | Markham | ............ | H04B 1/0064 |
| | | | | 455/456.3 |
| 2014/0193092 A1 | 7/2014 | Petyushko et al. | | |
| 2015/0043636 A1 | 2/2015 | Jung et al. | | |
| 2015/0371432 A1* | 12/2015 | Medioni | ............ | G06T 7/73 |
| | | | | 345/419 |
| 2016/0139887 A1* | 5/2016 | Pudiyapura | ............ | G06F 8/33 |
| | | | | 717/106 |
| 2017/0019419 A1* | 1/2017 | Kholidy | ............ | H04L 63/1416 |
| 2017/0193687 A1* | 7/2017 | Lo | ............ | G06T 5/001 |
| 2017/0214943 A1* | 7/2017 | Cohen | ............ | G06T 9/00 |
| 2017/0351775 A1* | 12/2017 | Rui | ............ | G06F 16/957 |
| 2018/0046885 A1* | 2/2018 | Barker | ............ | G06T 7/75 |
| 2018/0053324 A1* | 2/2018 | Cohen | ............ | G06T 9/005 |
| 2018/0268570 A1* | 9/2018 | Budagavi | ............ | G06T 9/001 |
| 2019/0116372 A1* | 4/2019 | Cohen | ............ | H04N 19/597 |

OTHER PUBLICATIONS

Fritsch et al., "Monotone Piecewise Cubic Interpolation", SIAM Journal on Numerical Analysis, vol. 17, No. 2, Apr. 1980, pp. 238-246.

Han et al., "A Moving Grid Framework for Geometric Deformable Models", International Journal of Computer Vision, vol. 84, No. 1, Mar. 26, 2009, pp. 63-79.

Schnabel et al., "Octree-based Point-Cloud Compression", 3rd EUROGRAPHICS/IEEE VGTC Conference on Point-Based Graphics, Boston, Massachusetts, USA, Jul. 29, 2006, pp. 111-121.

Bletterer et al., "Point Cloud Compression using Depth Maps", Electronic Imaging, vol. 2016, No. 21, Feb. 14, 2016, pp. 1-6.

Fan et al., "Point Cloud Compression Based on Hierachical Point Clustering", 2013 Asia-Pacific Signal and Information Processing Association Annual Summit and Conference (APSIPA), Kaohsiung, Taiwan, Oct. 29, 2013, pp. 1-7.

* cited by examiner

METHOD AND APPARATUS TO ENCODE AND DECODE TWO-DIMENSION POINT CLOUDS

1. REFERENCE TO RELATED EUROPEAN APPLICATION

This application claims priority from European Patent Application No. 17305504.7, entitled "Method and Apparatus to Encode and Decode Two-Dimension Point Clouds", filed on May 4, 2017, the contents of which are hereby incorporated by reference in its entirety.

2. TECHNICAL FIELD

The present disclosure relates to the domain of encoding and decoding data representative of two-dimension point clouds as frames of pixels, especially when the point cloud comprises dense parts and void parts.

3. BACKGROUND

A frame is an array of pixels containing a value, for example a color value or a depth value. A frame may be used to represent an image, and, in this case, every pixel is set to a meaningful value. A frame may also be used to encode other kinds of data, for example a two-dimension point cloud. A two-dimension point cloud is a set of two-dimension coordinates associated with a value, for example a color or a depth information. Coordinates of the points are expressed in the frame of reference of the frame. A two-dimension point cloud may be the result of the projection of a n-dimension point cloud on a surface, with n greater than two.

In this case, some pixels contain points and are given a meaningful value (e.g. color or depth) and some others do not contain points and get no value at all. To encode such an image, a default value is attributed to unused pixels. The default value has to be excluded from the range of meaningful values. In addition, as the frame is a rasterized surface, two close points may have to be encoded in the same pixel. This is a problem at the decoding side as it is no longer possible to distinguish these two points from a single information. This problem may be resolved by using one unused pixel to encode one of the two points and so not mixing their value in a single pixel. The problem is then to retrieve the original coordinates of the points.

Various techniques exist to optimize the use of pixels in a frame containing unused pixels. Grid generation algorithms, for instance, generate a mapping operator in order to better spread points of the two-dimension point cloud over the frame. The principles comprise in encoding distinct points in distinct pixels as much as possible by widening dense parts of the projected point cloud and tightening void parts of the projected point cloud. The mapping operator is often not a function (but a more complex algorithm) and is sometime not invertible. Such a mapping operator requires a lot of space to be encoded in a stream as it is not a parametrized function but a complex algorithm. In addition, at the decoding side, the inverse of the mapping operator is required to be computed in order to retrieve the original point cloud. Computing such an inverse operator is time and resource consuming, even if possible. Indeed, some of found mapping optimization solutions do not have inverse operators. There is a lack of a technical solution for optimizing point cloud spread on a frame with an efficient embedding of the inverse mapping operator within the stream.

4. SUMMARY

An aspect of the present disclosure involves overcoming the lack of an encoding and decoding method to store, compress and transmit two-dimension point clouds as frames.

Another aspect of the present disclosure relates to a method of decoding a two-dimension point cloud from a bit stream. The method comprises:

Obtaining, from the bit stream, a frame of pixels and data representative of an unfolded grid, the data being associated with the frame;

Determining an un-mapping operator according to said unfolded grid; and

Decoding the point cloud by applying the un-mapping operator to the frame.

In an embodiment, the un-mapping operator may be a piecewise bilinear interpolator parametrized with the unfolded grid.

According to another aspect, the unfolded grid may be associated with a group of frames in the bit stream and the method further comprises decoding frames of the group of frames by applying the un-mapping operator determined according to said unfolded grid to the frames of the group.

The present disclosure also relates to a method of encoding a two-dimension point cloud in a bit stream. The method comprises:

Generating an unfolded grid by mapping a regular grid according to a dense mapping operator;

Generating a frame of pixels by applying a mapping operator to the point cloud, said mapping operator being determined according to the unfolded grid; and Generating the bit stream by encoding said frame associated with data representative of said unfolded grid in the bit stream.

The method generates an operator optimizing the distribution of the points over the frame in order to minimize the number of 'non-used' pixels and to maximize the number of information pixels. An advantage of the method may be linked to the small size of data required to encode the mapping operator in the bit stream and in the low processing resources needed to compute the operator and its inverse at the decoding.

In an embodiment, the mapping operator is a piecewise bilinear interpolator parametrized with the unfolded grid.

According to an aspect, the dense mapping operator is determined for a group of point clouds, and the method further comprises generating a frame for each point cloud of the group of point clouds and associating the unfolded grid with the generated group of frames in the bit stream.

In an embodiment, the two-dimension point cloud may be a projection of a n-dimension point cloud on a surface, n being greater than 2.

The present disclosure also relates to a device comprising a memory associated with at least one processor configured to:

Obtain, from a bit stream, a frame of pixels and data representative of an unfolded grid, said data being associated with said frame;

Determine an un-mapping operator according to the unfolded grid; and

Decode the point cloud by applying the un-mapping operator to the frame.

In an embodiment, the un-mapping operator comprises a piecewise bilinear interpolator parametrized with the unfolded grid.

According to another aspect, the unfolded grid may be associated with a group of frames in the bit stream and the at least one processor may be further configured to decode frames of the group of frames by applying the un-mapping operator determined according to the unfolded grid to the frames.

The present disclosure also relates to a device comprising a memory associated with at least one processor configured to:

Generate an unfolded grid by mapping a regular grid according to a dense mapping operator;

Generate a frame of pixels by applying a mapping operator to a two-dimension point cloud, the mapping operator being determined according to the unfolded grid; and Generate a bit stream by encoding the frame associated with data representative of the unfolded grid in the bit stream.

In an embodiment, the mapping operator comprises a piecewise bilinear interpolator parametrized with the unfolded grid.

According to another aspect, the dense mapping operator may be determined for a group of point clouds, and the at least one processor may be further configured to generate a frame for each point cloud of said group of point clouds and to associate said unfolded grid with the generated group of frames in the bit stream.

In an embodiment, the two-dimension point cloud may be a projection of a n-dimension point cloud on a surface, n being greater than 2.

The present disclosure also relates to a stream carrying data representative of a two-dimension point cloud, wherein the data comprises:

a first syntax element relative to an unfolded grid generated by mapping a regular grid according to a dense mapping operator; and a second syntax element relative to at least one frame of pixels generated by applying a mapping operator to the two-dimension point cloud, the mapping operator being determined according to the unfolded grid;

wherein the unfolded grid may be associated with said at least one frame.

5. LIST OF FIGURES

The present disclosure will be better understood, and other specific features and advantages will emerge upon reading the following description, the description making reference to the annexed drawings wherein.

Figure 1:
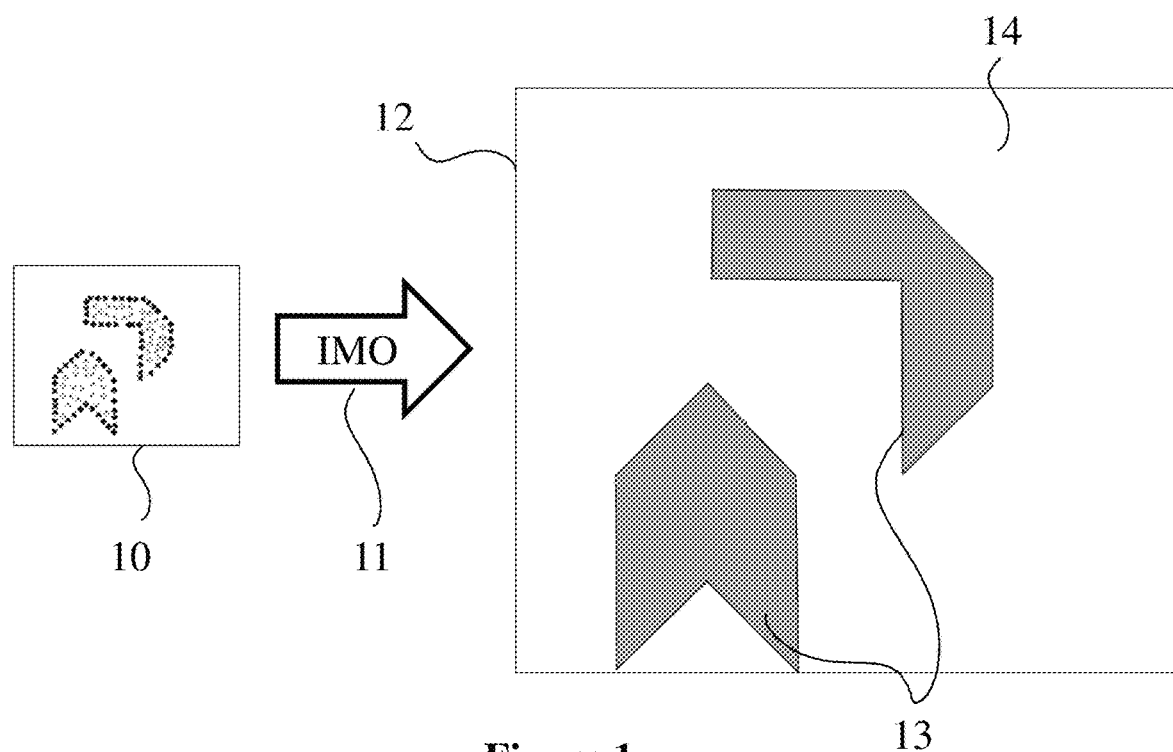
FIG. 1 illustrates a mapping operator for encoding a point cloud in a rasterized frame, according to an embodiment of the present principles.
Figure 2:
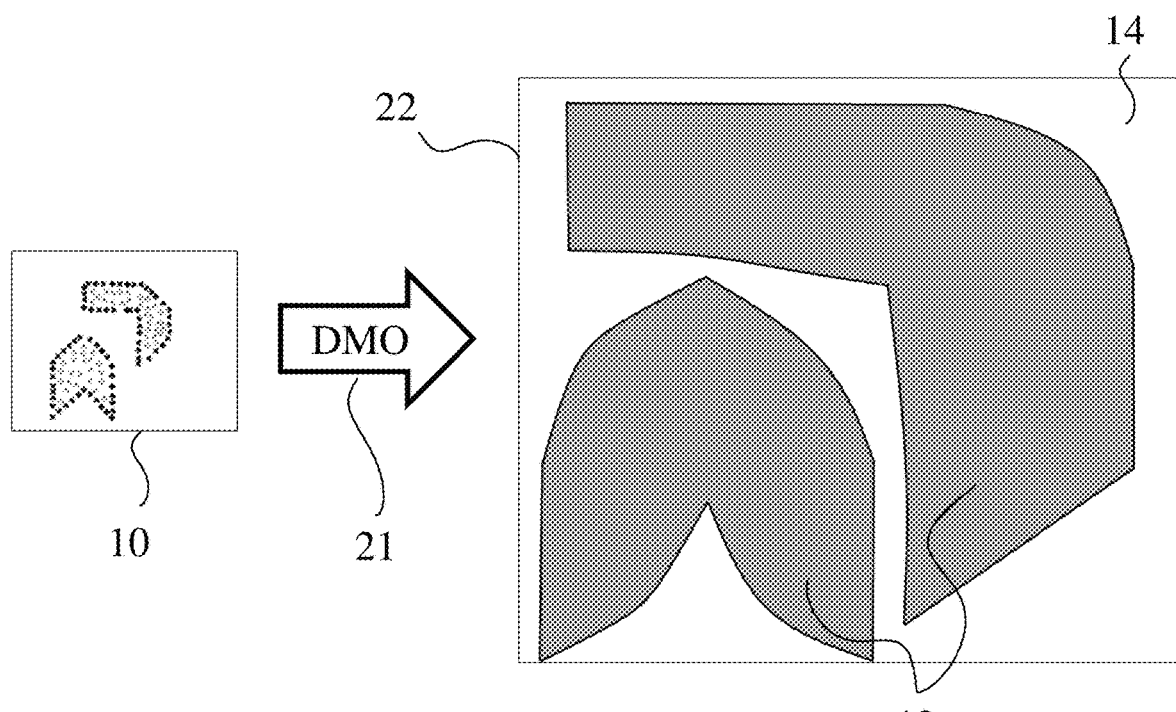
FIG. 2 illustrates a Dense Mapping Operator (DMO) which maps the points of the point cloud of FIG. 1 on a frame in non-orthogonal way, according to an embodiment of the present principles.
Figure 3:
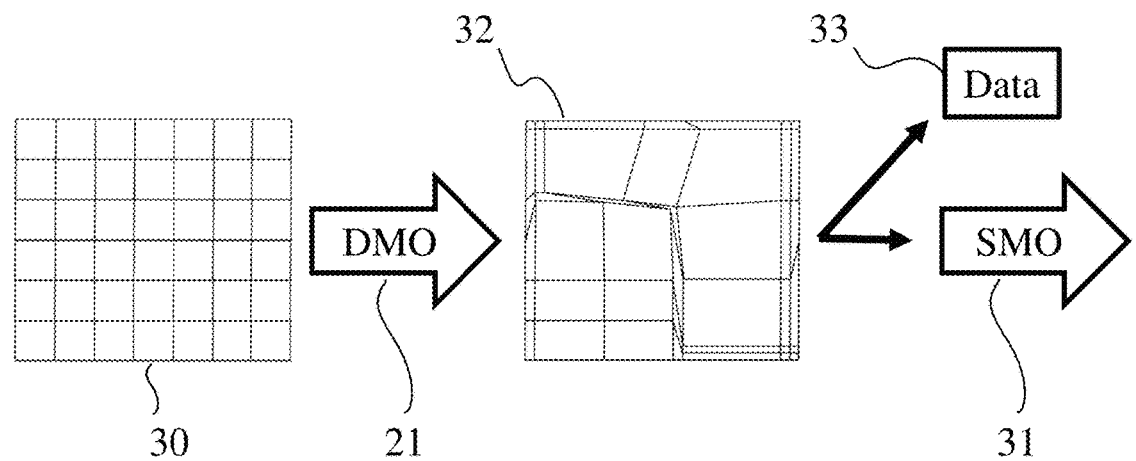
Figure 4:
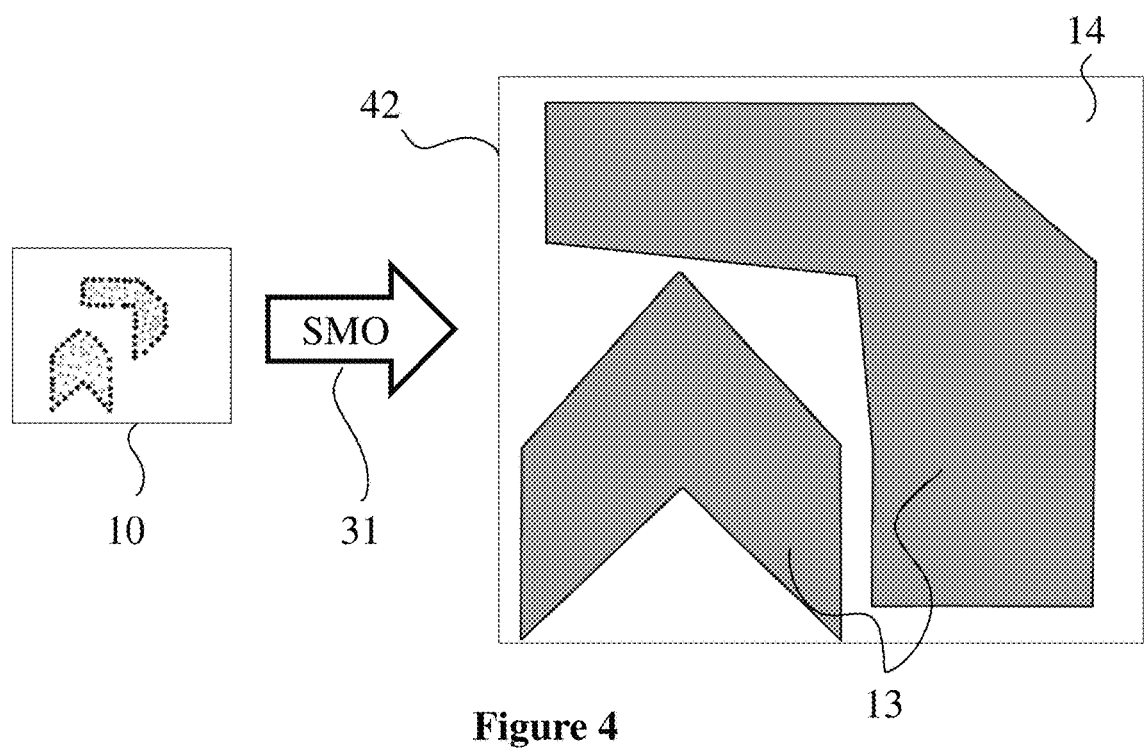
Figure 5:
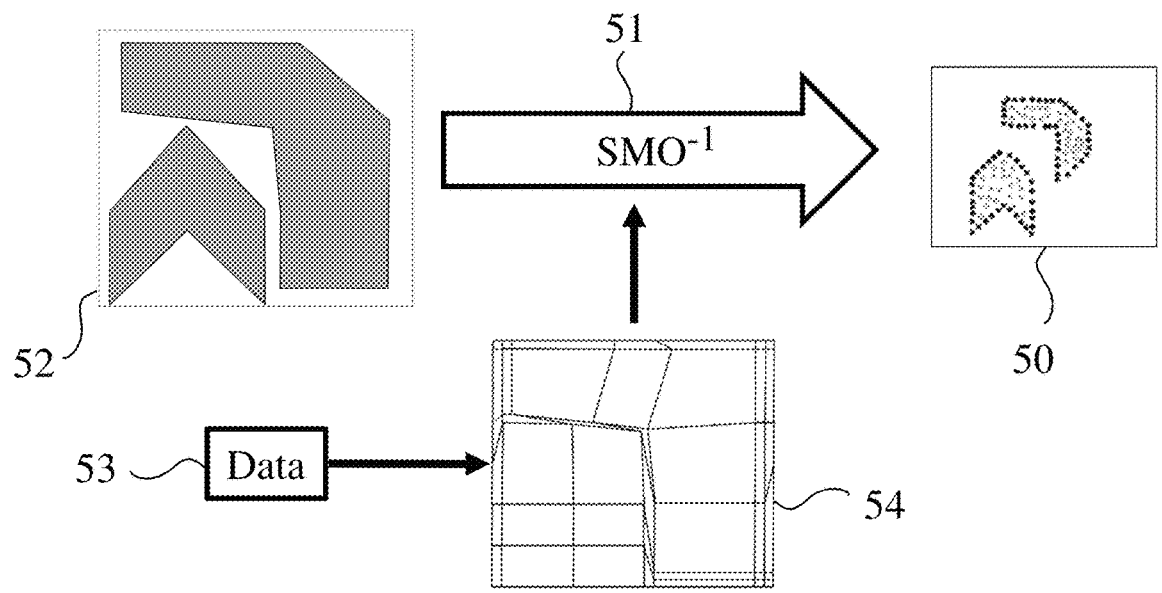
Figure 6:
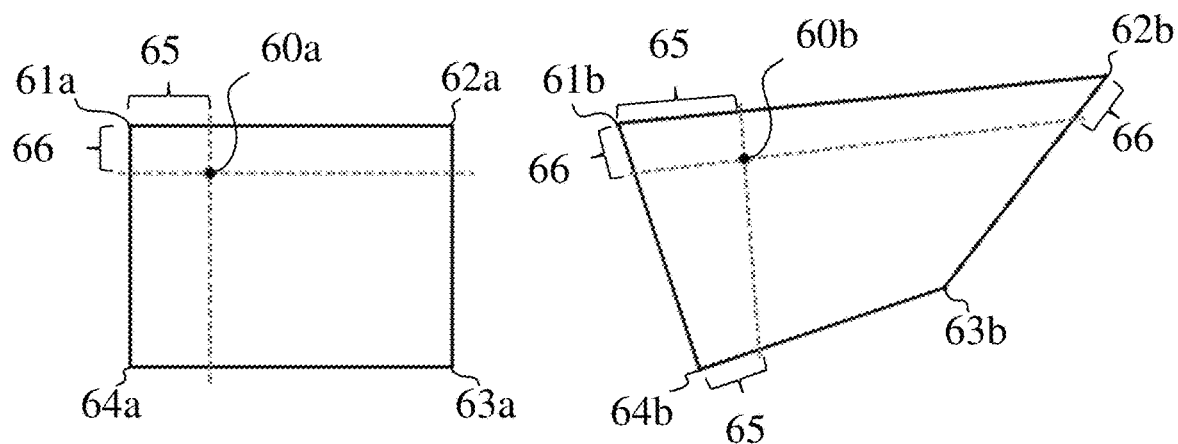
Figure 7:
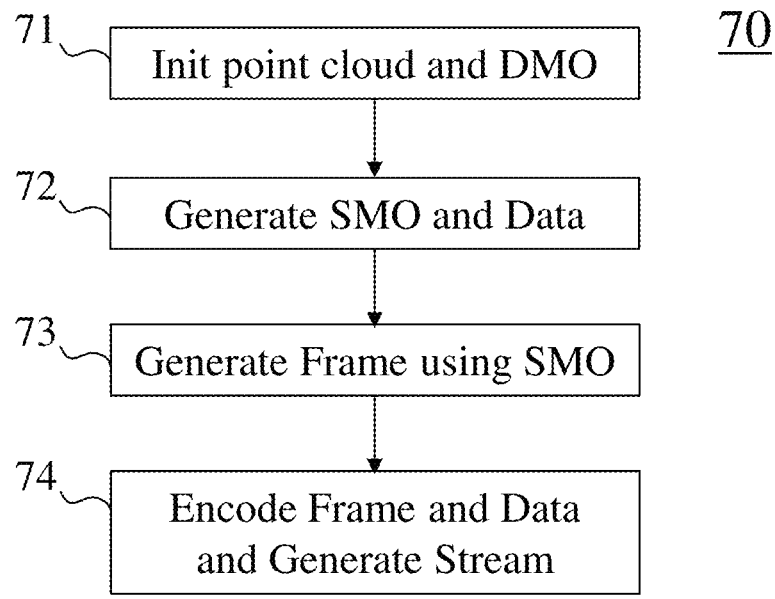
Figure 8:
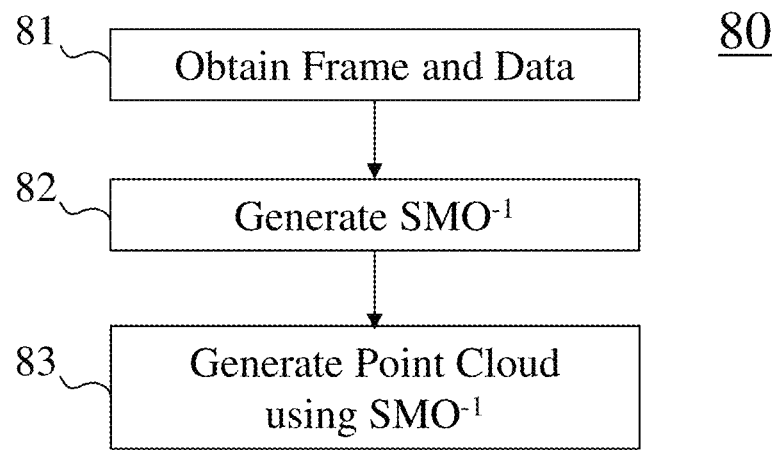
Figure 9:
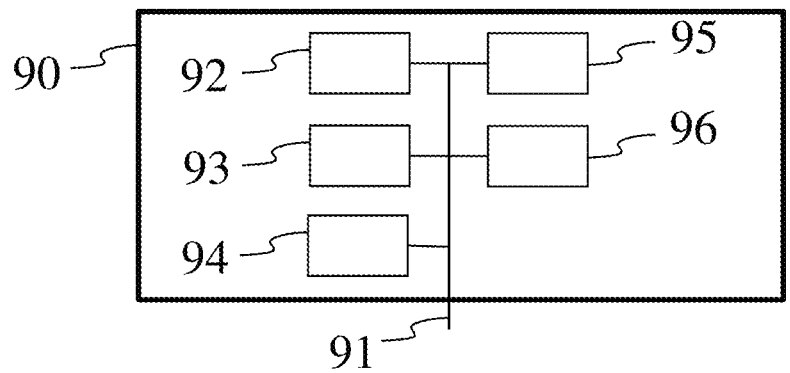
Figure 10:
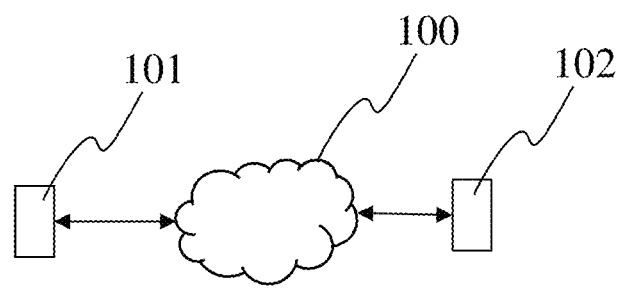
Figure 11:
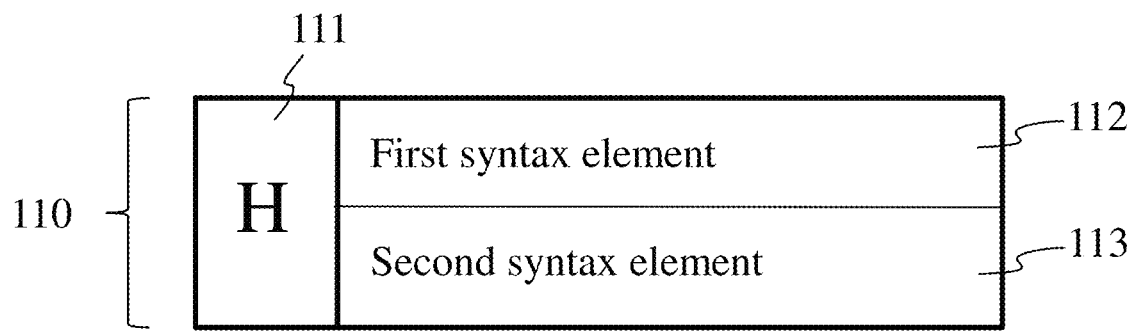

FIG. 3 diagrammatically shows the calculation of a Simplified Mapping Operator (SMO) from a Dense Mapping Operator of FIG. 2, according to the present principles;

FIG. 4 diagrammatically shows the encoding of a point cloud of FIG. 1 on a rectangular frame using a SMO as described on FIG. 3, according to an embodiment;

FIG. 5 diagrammatically illustrates the decoding of a point cloud from a frame associated with data respectively corresponding to the frame of FIG. 4 and the data of FIG. 3, according to an embodiment;

FIG. 6 illustrates how bilinear piecewise interpolation may be used according to the present principles;

FIG. 7 illustrates a method for encoding two-dimension point clouds according to a non-restrictive embodiment of the present principles;

FIG. 8 illustrates a method of decoding a two-dimension point cloud from a stream comprising a frame and data representative of an unfolded two-dimension grid, according to an embodiment of the present principles;

FIG. 9 shows an exemplary architecture of a device which may be configured to implement a method described in relation with FIGS. 7 and/or 8, according to an embodiment of the present principles;

FIG. 10 illustrates an example of a transmission of frame and data of FIGS. 3, 4 and 5 between two remote devices of FIG. 9 over a communication network, according to an embodiment of the present principles;

FIG. 11 shows an example of an embodiment of the syntax of such a stream when the data are transmitted over a packet-based transmission protocol, according to an embodiment of the present principles;

6. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

According to a non-limitative embodiment of the present disclosure, a method and a device to encode, transmit and decode two-dimension point clouds are disclosed in the present document.

A two-dimension point cloud is a set of two-dimension coordinates expressed in a frame of reference and associated with a value (e.g. a color or a depth). A two-dimension point cloud may be the result of a projection on a surface of a n-dimension point cloud with n greater than two. A two-dimension point cloud may be encoded in a rasterized frame (i.e. an array of pixels) mapped on the frame of reference. Every point of the point cloud is mapped to one pixel. Several points may be mapped to a single pixel. When two or more points are mapped to a single pixel, their associated information is combined, for example averaged. When, for a given pixel, no point is mapped, this pixel is set to a 'not-used' value. As color or depth pixels are not meant to embed a 'not-used' value, it is common in the art to create an additional frame in which pixels embed a Boolean value ('not used'/'used') and a default value is given to not-used pixels. Such a frame is called a "key frame" (or key image). Key frames are used as a mask to distinguish between meaningful pixels and not-used pixels. Key frames are usually not compressed or loss-less compressed because a small error in a key image may generate a big error in the decoded image. A same key frame may be used for several information frames (for instance a color frame and a depth frame). Both information frames and key frame are encoded in a stream and transmitted together. In a variant, information frames and key frame are transmitted separately.

FIG. 1 illustrates the usual mapping operator for encoding a point cloud in a rasterized frame. Each point of the point cloud 10 has coordinates in a frame of reference associated to the space and embeds at least one information, for instance, a depth or a color. A mapping operator 11 is used to map each point into a pixel of a frame 12. Frame 12 has a width (i.e. a number of pixel columns) and a height (i.e. a number of pixel rows). Identity Mapping Operator 11 (IMO) expresses the coordinates of the points of point cloud 10 according to the width and the height of frame 12. Identity Mapping Operator 11 associates to a point having coordinates (u,v) belonging to $[u_{min}, u_{max}] \times [v_{min}, v_{max}]$, with a corresponding pixel (i, j) belonging to $[0, W-1] \times [0, H-1]$ where W and H respectively stand for the width and the height of frame 12.

A general form for mapping operator 11 may be given by $$\binom{i}{j} = \text{floor}\left(\binom{W\ 0}{0\ H} M_0 \left(\left\{\begin{array}{l}(u - u_{min})/u_{max} - u_{min}\\(v - v_{min})/v_{max} - v_{min}\end{array}\right\}\right)\right) \quad [\text{eq. 1}]$$

Where $M_0$ is a normalized mapping operator which is the identity function in the case of $M_0$=IMO 11. Such an operator has the advantage to be simple to implement with a direct and simple to compute inverse operator. This operator has no need to be encoded in the stream as it is used as the default mapping operator and un-mapping in the state of the art. IMO 11 stores point information in pixels 13 of frame 12. For dense parts of the point cloud, it is highly probable that two or more points are mapped into a same pixel. Respective associated values are then combined in a unique (for instance averaged) value. A big part 14 of the frame pixels are set to 'not-used' value. This area 14 is useless whereas it could be used to store information of distinct points which are combined into a same pixel by IMO 11.

FIG. 2 illustrates a Dense Mapping Operator 21 (DMO) which maps the points of the point cloud 10 of FIG. 1 on a frame 22 in non-orthogonal way. The DMO 21 is an operator which maps points on a frame differently according to a local density of points in the cloud. Such an operator optimizes the distribution of the points over the frame in order to minimize the number of 'non-used' pixels and to maximize the number of information pixels. This technical effect is illustrated on FIG. 2: the useful part 13 of frame 22 is wider than the useful part of frame 12 of FIG. 1 while the 'not-used' part 14 of frame 22 is smaller than the 'not-used' part 14 of frame 12. Techniques exist to compute such a Dense Mapping Operator 21 and perform adaptive warping. Among these techniques, a category of grid generation algorithms (as, for example in "A Practical Guide to Direct Optimization for Planar Grid-Generation", J. E. CASTILLO, J. S. OTTO) has the advantage to ensure some key properties that such an operator should have. In particular, the grid generation algorithm has to be chosen to generate unfolded projection of the point cloud space in the frame space. It is a required property of the selected Dense Mapping Operator in order to allow computing a Simplified Mapping Operator, for example, as a bilinear piecewise interpolator.

An optimized Dense Mapping Operator 21 may be calculated for a frame or a sequence of frames such as a Group of Pictures (GOP) of video compression standards. Computing such a DMO is time and resource consuming. Computing the inverse operator is also complex. In some cases, the inverse operator is not even mathematically definable. In any case, encoding such an algorithm would require a long list of parameters which has to be loss-less compressed (or even not compressed at all). It would not be efficient to associate the encoding of a DMO or the encoding of its inverse $DMO^{-1}$ with a frame or a GOP. The computation of the DMO optimized for an image or a sequence of images is out of the scope of the present disclosure. DMO is computed to be optimal for a point cloud or a group of point clouds. DMO 21 may be different for different point clouds to encode. The mapping of point cloud 10 in frame 22 follows equation [eq. 1] where $M_0$=DM0 21.

FIG. 3 diagrammatically shows the calculation of a Simplified Mapping Operator 31 from a Dense Mapping Operator 21, according to the present principles. First, a regular grid 30 of K*L points is set. On FIG. 3, the points of the grid are linked by segments for visual purpose only. The grid is a set of points regularly distributed over the space of the point cloud. Coordinates of these points are regularly distributed in the frame of reference of the space. The information associated with these points is an existence value (i.e. a Boolean value). This regular point cloud (that is further referred as 'the grid') 30 is mapped on frame 32 using DMO 21 computed for point cloud (or group of point clouds) 10 of FIG. 2. As a result, the K*L points of the grid 30 are mapped in pixels of frame 32. Frame 32 has the same size as frame 22. On FIG. 3, the points of frame 32 are linked by segments for visual purpose only. Segments illustrate the unfolding key feature of Dense Mapping Operators such as DMO 21: the result of the projection by DMO 21 of the grid 30 is a grid; that is 'no segment of the mapped grid crosses another segment of the mapped grid'. Points of the grid 30 remain in the same structural order after mapping by DMO 21. Two points A and B of the grid 30 may be projected to the same pixel of image 32. If DMO 21 leads to such a situation, that comes from the fact that there is no point in the point cloud (or group of point clouds) 10 of FIG. 2 between (and/or within the close neighborhood of) the coordinates of points A and B.

According to the present principles, at this step, two objects are generated. First the K*L coordinates of the mapped points of grid 30 are stored and encoded in data 33. Data 33 are encoded as a K*L matrix of two-dimension coordinates. In a variant, data 33 are encoded as two K*L matrices of integers or floating numbers. In a variant, the K*L coordinates are normalized on the width and the height of the image and are stored in data 33. These matrices will be used to define, for example by parametrization, the inverse operator. Second, a Simplified Mapping Operator 31 is computed as an interpolator between points of grid 32. For instance, the interpolator may be a bilinear piecewise interpolator between projected points. In a variant, the interpolator may be a bicubic piecewise interpolator, as described, for instance in Fritsch, F. N., & Carlson, R. E. (1980) "*Monotone piecewise cubic interpolation*"; SIAM Journal on Numerical Analysis, 17(2), 238-246. In another variant, the interpolator may be a Lanczos filter that is well-known from persons skilled in the art.

Bilinear piecewise interpolation illustrated in FIG. 6 is a technique well-known by persons skilled in the domain of image processing. A point of point cloud 10 mapped by IMO 11 would have the coordinates 60a. This position can be expressed in the frame of reference of a rectangle defined by four points 61a, 62a, 63a and 64a of regular grid 30. This position is normalized in the rectangle. For example, coordinates 60a have an x-value equal to a percentage 65 of the length of segment [61a-62a] (and so of the segment [64a-63a]) and a y-value equal to a percentage 66 of the length of segment [61a-64a] (and so of the segment [62a-63a]). A bilinear piecewise interpolation keeps these percentages according to the segments corresponding to the mapping by DMO 21 of the four points 61a, 62a, 63a and 64a of regular grid 30. Coordinates 61b, 62b, 63b and 64b (stored in data 33) are the mappings by DMO 21 of respective coordinates 61a, 62a, 63a and 64a. The bilinear piecewise interpolation of coordinates 60a are then 60b. Percentage values 65 and 66 are kept by this transformation respectively on segments [61b-62b] and [64b-63b] for x-value and on segments [61b-64b] and [62b-63b] for y-value in the mapped frame of reference. This operator is simple to be determined according to coordinates 61b, 62b, 63b and 64b and its application to a point cloud is very fast to compute. The inverse function is based on the same principles and is simple to be determined according to coordinates 61b, 62b, 63b and 64b stored in data 33 and its application to a frame is very fast to compute. Further, A piecewise bilinear interpolator has the advantage to be fully determined by a sub-list of node points possibly small and easy to transfer and to store.

FIG. 4 diagrammatically shows the encoding of a point cloud 10 on a rectangular frame 42 using SMO 31 as described on FIG. 3, according to a particular embodiment of the present principles. If coordinates of a point of point cloud 10 correspond to one of the points of grid 30 of FIG. 3, the mapping of this point is the corresponding point in unfolded grid 32 stored in data 33. In other cases, the coordinates of a point of point cloud 10 belong to a "rectangle" of the grid 30; that is coordinates are located between four of the points of grid 30. The mapping is the bilinear piecewise interpolation between the corresponding four points of projected grid 32. The projection of point cloud 10 using SMO 21 generates a frame 42 in which the useful part 13 is wider than the useful part of frame 12 of FIG. 1 while the 'not-used' part 14 is smaller than the 'not-used' part 14 of frame 12. The application of SMO 21 follows equation [eq. 1] in which $M_0$=SMO 21.

Frame 42 is encoded and associated with data 33. Frame 42 may be compressed using a standard image or video compression algorithm. The compression algorithm may be chosen to be lossless. In a variant, a key map may be generated according to frame 42 and associated with frame 42 and data 33. A key map is a frame containing Boolean values (e.g. 0 or 1) wherein useful pixels are set to a given value (e.g. 1) and not-useful pixels are set to the other value (e.g. 0). Usually key maps are not or lossless compressed. Associated encoded data are transmitted to a decoder as one or more streams. In a variant, associated encoded data are stored on a local memory or storage medium.

FIG. 5 diagrammatically illustrates the decoding of a point cloud 50 from a frame 52 associated with data 53 respectively corresponding to frame 42 of FIG. 4 and data 33 of FIG. 3. Frame 52 and data 53 are obtained from a source. In the present document, obtaining frame and/or data has to be understood as receiving the data from a source or reading the data on a source. For example, the source belongs to a set comprising:

a local memory, e.g. a video memory or a RAM (or Random Access Memory), a flash memory, a ROM (or Read Only Memory), a hard disk;

a storage interface, e.g. an interface with a mass storage, a RAM, a flash memory, a ROM, an optical disc or a magnetic support; and a communication interface, e.g. a wireline interface (for example a bus interface, a wide area network interface, a local area network interface) or a wireless interface (such as a IEEE 802.11 interface or a Bluetooth® interface).

In a variant, data 53 and frame 52 are obtained from different sources. Data 53 correspond to data 33 calculated as described referring to FIG. 3. Compression and transmission may have slightly altered them. In a variant, a lossless compression method has been used and safe transmission ensured and data 53 are exactly the same as data 33. Data 53 comprise the coordinates of the K*L points of a grid 54. In a variant, data 33 have been normalized at the encoding; According to this variant, coordinates comprised in data 53 are expressed in a normalized space. An inverse Simplified Mapping Operator 51 (called $SMO^{-1}$ 51) is calculated according to data 53 (that is according to the corresponding unfolded grid 54). For normalized pixel coordinates (a, b), the evaluation of $SMO^{-1}$(a, b) comes down to a bilinear piecewise interpolation between the four neighbors values:

$$\left\{\begin{matrix}SMO_x^{-1}(A,B)\\SMO_y^{-1}(A,B)\end{matrix}\right\}, \left\{\begin{matrix}SMO_x^{-1}(A+1,B)\\SMO_y^{-1}(A+1,B)\end{matrix}\right\},$$

$$\left\{\begin{matrix}SMO_x^{-1}(A,B+1)\\SMO_y^{-1}(A,B+1)\end{matrix}\right\}, \left\{\begin{matrix}SMO_x^{-1}(A+1,B+1)\\SMO_y^{-1}(A+1,B+1)\end{matrix}\right\}$$

Where A=floor(Ka) and B=floor(Lb).

The result of the application of $SMO^{-1}$ 51 is a two-dimension point cloud 50. SMO 31 has the advantages of DMO 21 without its drawbacks. The use of a bilinear piecewise interpolation based of the mapping by DMO 21 of a regular grid 30 generates a frame 42 in which the use of pixels is optimized (i.e. the number of not-used pixels is minimized; the number of points of point cloud 10 mapped into a same pixel is minimized). A different SMO may be associated to each point cloud of a sequence of point clouds (e.g. a video). In a variant, an optimized SMO may be computed for a group of point clouds of a sequence of point clouds. At the same time, the encoding of SMO 21 requires a small amount of data 33 as a K*L matrix of two-dimension coordinates. At the decoding side, the computation of $SMO^{-1}$ from data 53 is straightforward and its application, a bilinear piecewise interpolation, is very efficient, requires limited time and processing resources.

FIG. 7 illustrates a method 70 for encoding two-dimension point clouds according to a non-restrictive embodiment of the present principles. In a step 71, the point cloud (or the sequence of point clouds) to encode are obtained from a source. The source may be, for example, a local memory, a storage interface or a communication interface. A two-dimension point cloud may be obtained by the projection of a n-dimension point cloud on a surface, n being greater than 2. In the case of a sequence of point clouds, point clouds may be grouped as pictures are grouped in GOP for standard video compression methods. A frame size (width and height of the target frames) is determined. For instance, the determined frame size is a standard image size like 640×480 (VGA) or 1920×1200 (widescreen). A Dense Mapping Operator is determined that optimized the use of pixels of a frame of the determined size for the point cloud (or the group of point clouds). The determined DMO minimize the number of unused pixels.

In a step 72, the determined DMO is applied to a regular grid of K*L points. The result of this computation is an unfolded grid of K*L mapped two-dimension coordinates which are stored in a K*L matrix of pairs of floating numbers. In a variant, these coordinates are stored in two matrices of floating numbers. In another variant, these coordinates are mapped in the frame and the indices of mapped pixels are stored in a matrix of pairs of integers or in two matrices of integers. These coordinates are used to parametrize a Simplified Mapping Operator which is a bilinear piecewise interpolator.

In a step 73, the parametrized SMO is applied to the point cloud (or each of the group of point clouds) to encode. A frame (or a group of frames) of the size determined at step 71 is generated. In a step 74, the generated frame (or group of frames) is encoded, for example, using a standard image or video compression method like MPEG 2 or H264. Data representative of the matrix (or matrices) of the mapped grid computed at step 72 are encoded. Encoded frame (or group of frames) and data are associated in a stream. In a variant, encoded frames and data are encoded in different streams. The stream is generated at this step and sent to a destination. A destination belongs to a set comprising, for example:

a local memory, e.g. a video memory or a RAM (or Random Access Memory), a flash memory, a ROM (or Read Only Memory), a hard disk;

a storage interface, e.g. an interface with a mass storage, a RAM, a flash memory, a ROM, an optical disc or a magnetic support; and a communication interface, e.g. a wireline interface (for example a bus interface, a wide area network interface, a local area network interface) or a wireless interface (such as an IEEE 802.11 interface or a Bluetooth® interface).

FIG. 8 illustrates a method 80 of decoding a two-dimension point cloud from a stream comprising a frame and data representative of an unfolded two-dimension grid. In a step 81, a frame of pixels and associated data representative of the unfolded grid (i.e. representative of a matrix of two-dimension coordinates) are obtained from a source. The source belongs to a set comprising a local memory, a storage interface and a communication interface. Coordinates of the data are representative of an unfolded grid of points. An inverse Simplified Mapping Operator (SMO$^{-1}$) is parametrized according to the coordinates of the data and to the size (width and height in pixels) of the frame. SMO$^{-1}$ is a bilinear piecewise interpolator. In a step 83, the parametrized SMO$^{-1}$ is applied to the frame obtained at step 81. This application generates a two-dimension point cloud. The same data may be associated to a group of frames and the same SMO$^{-1}$ is used to decode the frames of the group of frames. Parametrization and application of such an operator is simple and fast, and, requires limited time and processing resources for a processor or a graphic board.

FIG. 9 shows an exemplary architecture of a device 90 which may be configured to implement a method described in relation with FIGS. 7 and/or 8.

The device 90 comprises following elements that are linked together by a data and address bus 91:

a microprocessor 92 (or CPU), which is, for example, a DSP (or Digital Signal Processor);
a ROM (or Read Only Memory) 93;
a RAM (or Random Access Memory) 94;
a storage interface 95;
an I/O interface 96 for reception of data to transmit, from an application; and
a power supply, e.g. a battery.

In accordance with an example, the power supply is external to the device. In each of mentioned memory, the word «register» used in the specification can correspond to area of small capacity (some bits) or to very large area (e.g. a whole program or large amount of received or decoded data). The ROM 93 comprises at least a program and parameters. The ROM 93 may store algorithms and instructions to perform techniques in accordance with present principles. When switched on, the CPU 92 uploads the program in the RAM and executes the corresponding instructions.

The RAM 94 comprises, in a register, the program executed by the CPU 92 and uploaded after switch on of the device 90, input data in a register, intermediate data in different states of the method in a register, and other variables used for the execution of the method in a register.

In accordance with an example of encoding or an encoder, the point cloud (or the sequence of point clouds) is obtained from a source. For example, the source belongs to a set comprising:

a local memory (93 or 94), e.g. a video memory or a RAM (or Random Access Memory), a flash memory, a ROM (or Read Only Memory), a hard disk;

a storage interface (95), e.g. an interface with a mass storage, a RAM, a flash memory, a ROM, an optical disc or a magnetic support;

a communication interface (96), e.g. a wireline interface (for example a bus interface, a wide area network interface, a local area network interface) or a wireless interface (such as an IEEE 802.11 interface or a Bluetooth® interface); and a user interface such as a Graphical User Interface enabling a user to input data.

In accordance with examples of the decoding or decoder (s), the frame and the data representative of a matric of coordinates are sent to a destination; specifically, the destination belongs to a set comprising:

a local memory (93 or 94), e.g. a video memory or a RAM, a flash memory, a hard disk;

a storage interface (95), e.g. an interface with a mass storage, a RAM, a flash memory, a ROM, an optical disc or a magnetic support; and a communication interface (96), e.g. a wireline interface (for example a bus interface (e.g. USB (or Universal Serial Bus)), a wide area network interface, a local area network interface, a HDMI (High Definition Multimedia Interface) interface) or a wireless interface (such as an IEEE 802.11 interface, WiFi® or a Bluetooth® interface).

In accordance with examples of encoding or encoder, a bitstream comprising the frame and data representative of a matrix of two-dimension coordinates is sent to a destination. As an example, the bitstream is stored in a local or remote memory, e.g. a video memory (94) or a RAM (94), a hard disk (93). In a variant, the bitstream is sent to a storage interface (95), e.g. an interface with a mass storage, a flash memory, ROM, an optical disc or a magnetic support and/or transmitted over a communication interface (96), e.g. an interface to a point to point link, a communication bus, a point to multipoint link or a broadcast network.

In accordance with examples of decoding or decoder or renderer, the bitstream is obtained from a source. Exemplarily, the bitstream is read from a local memory, e.g. a video memory (94), a RAM (94), a ROM (93), a flash memory (93) or a hard disk (93). In a variant, the bitstream is received from a storage interface (95), e.g. an interface with a mass storage, a RAM, a ROM, a flash memory, an optical disc or a magnetic support and/or received from a communication interface (95), e.g. an interface to a point to point link, a bus, a point to multipoint link or a broadcast network.

In accordance with examples, the device 90 is configured to implement a method described in relation with FIG. 7, and belongs to a set comprising: a mobile device;
a communication device;
a game device;
a tablet (or tablet computer);
a laptop;
a still picture camera;
a video camera;

an encoding chip;

a server (e.g. a broadcast server, a video-on-demand server or a web server).

In accordance with examples, the device 90 is configured to implement a rendering method described in relation with FIG. 8, and belongs to a set comprising:

a mobile device;
a communication device;
a game device;
a set top box;
a TV set;
a tablet (or tablet computer);
a laptop; and
a display (such as a HMD for example).

In accordance with an example illustrated in FIG. 10, in a transmission context between two remote devices 101 and 102 (of the type of the device 90) over a communication network NET 100, the device 101 comprises means which are configured to implement a method for encoding point clouds and generating a stream as described in relation with the FIG. 7, and the device 102 comprises means which are configured to implement a method for decoding point clouds as described in relation with FIG. 8.

In accordance with an example, the network 100 is a LAN or WLAN network, adapted to broadcast still pictures or video pictures with associated data from device 101 to decoding devices including the device 102.

FIG. 11 shows an example of an embodiment of the syntax of such a stream when the data are transmitted over a packet-based transmission protocol. FIG. 11 shows an example structure 110 of a bit stream. The structure comprises a container which organizes the stream in independent syntax elements. The structure may comprise a header part 111 which is a set of data common to every syntax elements of the stream. For example, the header part contains metadata about syntax elements, describing the nature and the role of each of them. The structure may comprise a payload comprising syntax elements 112 and 113, the first syntax element 112 being relative to the data representative of the unfolded grids, for example as matrices of two-dimension coordinates, and, the second syntax element 113 being relative to the frames generated by the Simplified Mapping Operator. Data representative of an unfolded grid comprise an information associating the unfolded grid to at least one frame. For example, frames are identified by a number of GOP and a number of frame within the GOP. The number of GOP is associated with the unfolded grid of the SMO which generated the frames of this GOP.

Naturally, the present disclosure is not limited to the embodiments previously described.

In particular, the present disclosure is not limited to a method of encoding or decoding a two-dimension point cloud but also extends to any method of transmitting a stream representative of point clouds, to method of encoding and decoding sequences of two-dimension point clouds and to any device implementing these methods. The implementation of calculations necessary to generate the frames and data representative to the SMO is not limited either to an implementation in shader type microprograms but also extends to an implementation in any program type, for example programs that can be executed by a CPU type microprocessor. The use of the methods of the present disclosure is not limited to a live utilization but also extends to any other utilization, for example for processing known as postproduction processing in a recording studio.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of decoding a two-dimension point cloud from a bit stream, said method comprising:
   obtaining, from the bit stream, a frame of pixels and a matrix of two-dimension coordinates in said frame representative of an unfolded grid, said matrix being obtained by mapping a regular grid according to a dense mapping operator that decreases the number of unused pixels of the frame for said two-dimension point cloud;
   determining an un-mapping operator as a piecewise bilinear interpolator parametrized with said matrix; and
   decoding the two-dimension point cloud by applying said un-mapping operator to said frame.

2. The method of claim 1, wherein the matrix is associated with a group of frames in the bit stream, the method further comprising decoding frames of said group of frames by applying the un-mapping operator determined according to said matrix to said frames.

3. A method of encoding a two-dimension point cloud in a bit stream, the method comprising:
   generating a matrix of two-dimension coordinates representative of an unfolded grid by mapping a regular grid according to a dense mapping operator, the dense mapping operator being a mapping operator decreasing the number of unused pixels of a second frame of pixels encoding said two-dimension point cloud;
   generating a first frame of pixels by applying a mapping operator to said two-dimension point cloud, said mapping operator being determined as a piecewise bilinear interpolator parametrized with said matrix; and
   generating the bit stream by encoding said first frame associated with said matrix of two-dimension coordinates representative of said unfolded grid in the bit stream.

4. The method of claim 3, wherein the dense mapping operator is determined for a group of two-dimension point clouds, and further comprising generating a frame for each point cloud of said group of two-dimension point clouds and associating said matrix with the generated group of frames in the bit stream.

5. The method of claim 3, wherein the two-dimension point cloud is a projection of a n-dimension point cloud on a surface, n being greater than two.

6. A device comprising a memory associated with at least one processor configured to:
   obtain, from a bit stream, a frame of pixels and a matrix of two-dimension coordinates in said frame representative of an unfolded grid, said matrix being obtained by mapping a regular grid according to a dense mapping operator that decreases the number of unused pixels of the frame for said two-dimension point cloud;
   determine an un-mapping operator as a piecewise bilinear interpolator parametrized with said matrix; and
   decode the two-dimension point cloud by applying said un-mapping operator to said frame.

7. The device of claim 6, wherein the matrix is associated with a group of frames in the bit stream, and wherein said at least one processor is further configured to decode frames of said group of frames by applying the un-mapping operator determined according to said matrix to said frames.

8. A device comprising a memory associated with at least one processor configured to:
   generate a matrix of two-dimension coordinates representative of an unfolded grid by mapping a regular grid according to a dense mapping operator; the dense mapping operator being a mapping operator decreasing the number of unused pixels of a second frame of pixels encoding said two-dimension point cloud;
   generate a first frame of pixels by applying a mapping operator to said two-dimension point cloud, said mapping operator being determined as a piecewise bilinear interpolation parametrized with said matrix; and
   generate a bit stream by encoding said first frame associated with said matrix in the bit stream.

9. The device of claim 8, wherein the dense mapping operator is determined for a group of two-dimension point clouds, and wherein said at least one processor is further configured to generate a frame for each point cloud of said group of two-dimension point clouds and to associate said matrix with the generated group of frames in the bit stream.

10. The device of claim 8, wherein the two-dimension point cloud is a projection of a n-dimension point cloud on a surface, n being greater than two.

11. A non-transitory medium storing data representative of a two-dimension point cloud, wherein the data comprises:
   a matrix of two-dimension coordinates representative of an unfolded grid generated by mapping a regular grid according to a dense mapping operator, the dense mapping operator being a mapping operator decreasing the number of unused pixels of a frame for said two-dimension point cloud; and
   a first frame of pixels generated by applying a mapping operator to a second frame of pixels encoding the two-dimension point cloud, said mapping operator being determined as a piecewise bilinear interpolation parametrized with said matrix, wherein the matrix is associated with said frame.

* * * * *